Patented Feb. 26, 1952

2,586,818

UNITED STATES PATENT OFFICE 2,586,818

PROGRESSIVE CLASSIFYING OR TREATING SOLIDS IN A FLUIDIZED BED THEREOF

Viggo Harms, New York, N. Y.

Application August 21, 1947, Serial No. 769,842

37 Claims. (Cl. 259—4)

1

This invention relates to the drying and classifying of solids.

The invention relates to a process and apparatus in which there is established and maintained, during the performing and operation of the apparatus for realizing the invention, a marginally confined ever-changing body of solids material maintained in fluidized condition on a gas-permeable constriction plate through which gas is delivered in the low portion of the ever-changing bed, to wit, as a constantly upflowing stream of gas with sufficient force whereby the pressure employed on the gas causes the solids to take on the appearance simulating boiling liquid within which a fluid-level is presented and there is a constant change in position of the solid particles relative to each other whereby dust particles or solids in the finer form may rise within the flowing gaseous stream and thence upwardly from said body as outflowing suspended finer particles of dust into a freeboard or gas-receiving space directly overlying such ever-changing body.

If gas is so forced diffusingly through the solids, various things will happen to the solids depending upon the velocity at which the uprising gas passes the solids. At high velocity, the gas will blow the solids out of the cylinder, while at low velocity, the solids may remain immobile or have a slight movement relative to each other. In between these two extremes are two other possible happenings. One is where the velocity is not great enough to blow the solids out of the cylinder but is great enough to cause the solids to become highly turbulent and mobilized with the result that the mobilized solids act like a fluid and indeed the top of the bed thereof assumes what may be termed a fluid-level, in which condition the fluidized bed of solids is of homogeneous character in so far as its being a mixture of dispersed larger and smaller solids. That is, there is no tendency of larger solids to stratify in the lower section of the bed or of lighter or finer solids to stratify in the upper section of the bed. Another lower velocity is one where such stratification takes place while still maintaining the solids in fluidized and somewhat mobilized condition. In other words, the extent of fluidization is sufficient to permit such stratification or classification but insufficient to substantially disrupt such stratas of sized solids after they have been once formed.

According to one feature of the invention, the ever-changing body is functionally divided by a partial partitioning means into that which is

2 herein termed (a) an operating chamber, which may be a treating chamber, and (b) a subsequent chamber or that which may be termed as a large size solids or final solids-receiving chamber, to wit, a chamber that receives solids passing laterally below the partial partitioning means from the lower portion of the aforementioned operating or treating chamber into the subsequent or treated solids receiving chamber.

According to the apparatus of this invention there is a downwardly and outwardly extending discharge pipe or small solids discharge conduit having an overflow edge or solids overflow weir past which solids of small or intermediate size move or flow thereover from the upper or surface portion of the ever-changing body portion or section within the operating or treating chamber and thereby determining the normal operative surface level of that portion of the bed within the treating chamber.

A second downwardly and outwardly extending discharge pipe or coarse-solids discharge conduit leads from the final or subsequent chamber and provides a coarse solids overflow-edge or coarse-solids overflow weir at the upper portion thereof which is at elevation proximate that of the small solids overflow weir for the operating compartment.

According to the invention the elevation of the overflow weirs just mentioned are higher than that of the solids transfer area or passageway at the lower portion of the partial partition but lower than that of the upper edge portion of said partial partition.

The gaseous medium employed or selected is determined according to the classifying or chemical functions sought to be realized, or according to a chemical treatment or physical treatment such as drying and classifying sought to be realized. The gaseous medium employed is selected according to the treatment and the temperature requirements and is also selectively determined as to the heat treatment and reactive effects which may be desired or required to attain the sought for characteristics of a particular material or end product derivable from the feed material supplied.

More particularly there is embodied a reactor or classifying means having an enclosing casing in which there is maintained an ever-changing constantly-renewable body of solids overlying a gas permeable apertured partition providing an intermediate floor dividing the casing into an upper and lower compartment or compartments providing means and through which apertured partition the particular selected gaseous medium flows upwardly into the solids constituting said bed, to wit, in a distributed manner and with sufficient force to effect a fluidized appearance for the bed or for effecting a stratification of the solids of the bed. The general upper elevation or level of the bed is determined by solids overflowing means or downcomer conduits the entrance upper ends of which provide or constitute the solids overflow weirs or weir edges that determine the relatively normal operative level of the bed sections served thereby or to which they correspond; the elevation of these weirs or overflow edges just referred to is lower than that of the interior of the upper portion of the casing whereby a freeboard or gas-receiving space is provided above the ever-changing bed of solids maintained on or above the constriction plate. Below the constriction plate there is provided the gas-receiving region or compartment providing structure into which the gaseous medium is supplied and from which it passes upwardly through the constriction plate as the gaseous medium for treating, or for performing a physical operative change, or for effecting size classification upon the solids of the bed.

Within the tank or reactor there is provided a baffle member serving as bed partitioning means rising to elevation higher than that of the solids overflow weir and terminating at elevation below that of said weirs but higher than that of the constriction plate and positioned so as to transversely divide the solids of the bed into what may be a treating or classifying compartment or zone and which compartment or zone wherein solids of small or intermediate size tend to remain and collect while finer solids passed as dust therefrom and within the lower portion of which there assemble or collect the larger size or coarse solids as a lower layer or strata from which they pass laterally below or through the passage area at the lower portion of the baffle or partial partition into and thence upwardly within a subsequent compartment or zone to a location from which the solids of large side progressively overflow into its downflow pipe or conduit to a locality outside of the apparatus.

As the apparatus functions and the process proceeds, the solids of small or intermediate size progressively pass from the upper portion of the ever-changing body in the reaction or operative chamber or zone, to wit, as overflow past the overflow weir or edge of a small solids discharge pipe or conduit, and therethrough to a region outside of the treating tank or reactor.

According to certain forms of the apparatus and the operative processes carried out therein or realized thereby, the main end products are small or intermediate solids or solids fraction and coarse or large solids or solids fraction and these end fractions are independent of that which may be viewed as fine solids or dust that may be passed from the apparatus or reactor tank as solids entrained in the outgoing gases. The fine solids or dust particles may be removed or separated from the gases and collected as a third or fine fraction.

According to other forms of the apparatus and the operative processes carried out therein, the main solids in product to be attained is in the form of solid material built up into the form of pellets, balls or spheres produced by progressive building up operations.

Various novel features of the apparatus and of the process or operations carried out therein will become apparent from the detailed description which follows particularly when considered in connection with the drawings hereinafter referred to.

Novel features considered characteristic of my invention are set forth with particularity in the appended claims. The invention itself, however, both as to its organization and its method of operation, together with additional objects and advantages thereof, will best be understood from the following description of illustrated embodiments thereof when read in conjunction with the accompanying drawings constituting a part of this specification.

In said drawings:

Fig. 1 is a vertical view diagrammatically one embodiment of a classifier or classifying apparatus functionable as a combined classifying and drying apparatus having a relatively closed tank or treating chamber wherein solids are fed into a marginally confined ever-changing fluidized bed of solids therein that are maintained over and supported by a flow constriction plate and while thereupon are so treated or physically acted upon by gaseous media upflowing into the bed from the constriction plate, that the solids are classified whereby small or intermediate solids are passed as small or undersized classified solids which overflow from an elevation vertically spaced above the constriction plate and are delivered to a region outside of the tank while coarser solids pass below the partial partition within the tank and rise after passing said partition to an elevation into a locality functionally separated by the partial partition from the small solids and from which the thus rising coarser solids overflow into a discharge conduit from which they are passed to a region outside of the tank. In apparatus illustrated by this figure gaseous media carrying entrained fine solids rising from the bed are passed to a collector from which as dust particles they are separated out and recovered as a dust or fine particle fraction.

In accordance with the detailed construction of each form of apparatus of Figs. 1, 2 and 3, said definite characteristics and features are hereinafter more fully described.

Figure 1:
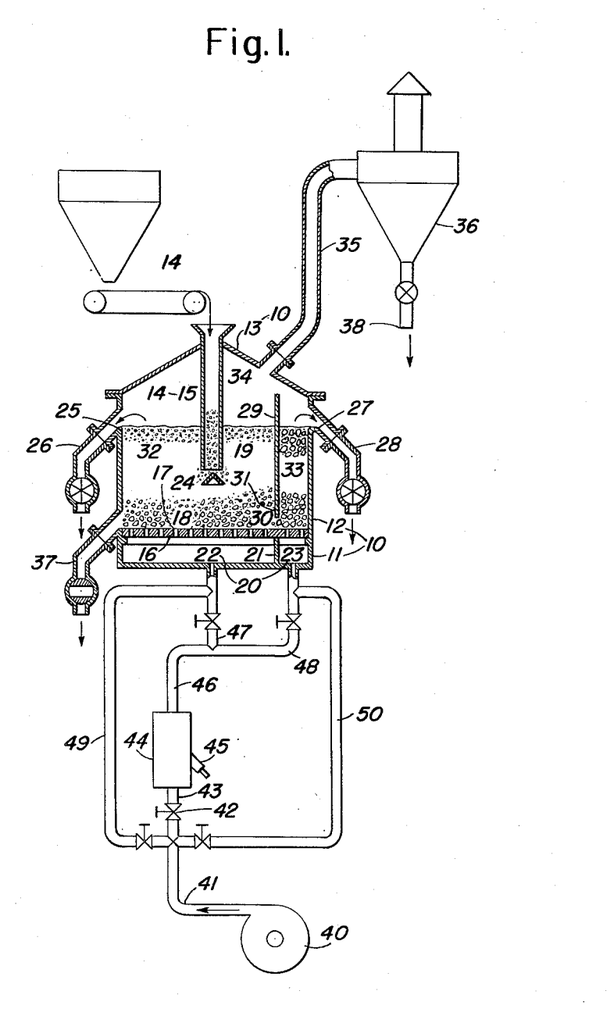

RESPECTING APPARATUS OF FIG. 1

*Process and apparatus relating to the classifying and treating of granular material*

The apparatus of Fig. 1 under the above caption may also be described as a combined drying and classifying apparatus. It includes a main tank 10 having a bottom 11, marginal walls 12, and an upper closure or top member 13. A feed mechanism 14 is provided having a discharge chute or descending chute or feed conduit 15 by which solids material is delivered into the tank for treatment or classification therein. In the tank there is provided a stationary horizontally-extending apertured flow constriction plate 16 providing a bed-supporting member. In this plate there are a large number of relatively small holes or apertures 17 through which gas or air-heated or unheated, as the case may be, is supplied under pressure and is forcibly delivered upwardly therethrough and from the apertures 17 thereof into the lower portion 18 of an ever-changing bed 19 of solids material supported on and maintained over the constriction plate. The air or gas thus supplied under pressure is initially delivered into a plenum box or plenum chamber 20 divided by a vertical and transverse diaphragm 21 into a large plenum section 22 and a smaller plenum section 23.

The gas or air supplied to these sections is delivered thereto through the medium of piping by which according to the particular mode of use of the air or gas delivery means employed said sections 22 and 23 (a) can collectively function as a single plenum chamber (as if the diaphragm 21 was not embodied in the construction) or (b) can severally function each according to a particular requirement. According to the piping arrangement shown gas may be supplied at different pressures to the different plenum sections, or any one chamber section may selectively receive a cold gaseous medium while the other plenum section may receive a heated gaseous medium, or if desired hot gas, or hot gas tempered by cold air at will, can be selectively delivered to either or to both of said plenum sections.

The material supplied within the tank whereby to provide and assure an ever-changing bed of solids supported on and above the apertured flow constriction plate and the bed thus supplied is established and maintained in a fluid state or condition by which the surface of the bed simulates a body of boiling liquid. This bed of fluidized solids as such bed is called rises to or extends upwardly to an elevation substantially higher than that of the constriction flow plate, to wit, to an elevation which may be termed as a solids overflow elevation as determined by an overflow-weir edge 25 of solids-discharge conduit or transfer means 26 leading from the interior of the tank to a region outside of the tank. This discharge conduit 26 is herein referred to as an undersize or small-solids discharge means or as a discharge conduit for passing or conducting classified granular small or undersized solids from the tank.

Functionally spaced from the small or undersized-solids discharge conduit 26 there is provided a coarse-solids discharge conduit 28 for passing or conducting from the tank the larger granular material or oversize granules as such larger solids may be referred to. This discharge conduit 28 has a coarse or larger solids overflow weir edge 27 which is at an elevation substantially higher than that of the supporting surface of the flow constriction plate and which is generally at an elevation approximately but not necessarily that of the overflow weir edge 25 of the small-solids discharge conduit 26.

At a location functionally disposed between the overflow weir edges just mentioned there is provided a partial partition means 29 extending upwardly within and above the ever-changing fluid solids bed. As to this particular partition there is provided a coarse or large solids transfer area 30 defined by a low portion or edge 31 of the partial partition or baffle 29, which low edge 31 is at an elevation lower than that of the weir edges 25 and 27 but is vertically spaced above the flow constriction plate 16. The partial partition or baffle 29 also extends to an elevation higher than that of the overflow weir edges 25 and 27 but terminates at an elevation below the upper interior portion of the tank top; it also extends in a horizontal direction whereby to provide at one side thereof an initial or large treating or classifying section 32 into which the fed material to be classified or treated is initially received and at the other side thereof a subsequent or coarse solids section 33 into the lower portion of which coarse solids are received as they pass from the large initial-receiving section 32 through the transfer area 30 to the subsequent coarse solids compartment or section 33. In this last section the coarse solids progressively rise and pass as overflow therefrom as large solids overflowing the weir 27 and ultimately through the solids discharge conduit 28 to a region outside the tank. As the classifying treating or drying process proceeds the left-behind solids which continue in the initial section 32 of the bed progressively rise and reach the level of the fluidized bed as determined by the overflow weir edge 25 and progressively pass as outflowing small or undersized solids through the solids-discharge conduit 26 to a region outside of the tank.

Also as a classifying and treating or drying and classifying process proceeds the air or gas passing upwardly through and from the fluidized bed reaches an overlying gas-receiving area or region 34 with fine particles entrained in the gas as suspended dust solids therein and from this upper interior portion or region 34 the dust-laden gas passes as by conduit means 35 into a dust-collector provided as by a cyclone separator 36 by which gaseous medium freed of certain fine solids or dust formerly entrained therein is caused to pass from the separator along one path while separated-out fine solids or dust particles are collected and passed along another path as through gated conduit 38 leading to an outside receiving zone therefor. In the construction shown the feed chute 15 extends downwardly to a discharge elevation lower than that of the overflow weirs and a bell-shaped distributor 24 is provided at the lower end of the feed chute 15. Feed material building up within chute 15 to an elevation higher than that of solids overflow weir 25 acts as a seal to prevent air or gases from going up through the vertical feed pipe or chute 15.

In many forms of apparatus the delivery of feed material is at an elevation or locality above that of the operative surface level of the bed, to wit, at an elevation higher than that of the solids overflow weir edges referred to. The question of elevation and the delivery of the feed material to a certain extent may depend upon the character of the solids material supplied for treatment or for classification as the case may be. Apparatus of this figure can be advantageously use in the drying, treating and classifying of solids in the lime industry.

Reverting now to the means by which air or gaseous medium is supplied to the plenum chamber 20, or as otherwise expressed, into the plenum chamber sections 22 and 23, this is described as follows:

Assuming that gas or air is supplied under pressure as by an airblower or pump 40, this may be considered as having an air-delivery duct 41 providing an air main having a main air gate or valve 42 and leading at 43 into a heater or heat exchanger 44. This heater is equipped with any type of heating apparatus or heat-providing means 45 suitable for the direct or indirect heating of the gas or air supplied to the member 44 to be heated therein or thereby. From this heater, or heat exchanger 44 there is a hot-gas discharge line 46 having valve-controlled branches 47 and 48 either or both of which when a particular valve or valves thereof are open can respectively deliver heated gas or air to the respective plenum sections 22 and 23 to which the valve controlled branch lines 47 and 48 respectively extend.

The air or gas supply means also has valve controlled branches 49 and 50 respectively leading from the duct 41, to wit, from a region of said duct between the lower or pump 40 on the one hand and the gate or valve 42 to the corresponding large plenum section 22 and the small plenum section 23 whereby as and when desired either hot or cold or tempered gaseous medium can be delivered into a selected plenum section or into both of said plenum sections.

While the apparatus described may function primarily as a classifier for granular material of different sizes, nevertheless by proper operation thereof it may be employed for effecting a treating of materials whereby to obtain effects beyond that of a mere sizing operation, such as drying. The apparatus is shown as provided with a valved or gated auxiliary discharge conduit 37 leading from the lowermost portion of the solids bed or region 18 to provide a means by which an existing charge of solids material can be readily removed from within the tank in a relatively convenient manner.

The air classifier operates as follows: The mixed materials under influence of the upward gas flow will form and maintain a fluidized bed within which the coarse solids will sink to the bottom and spread out as a layer above the constriction plate from whence the coarse solids pass into and thence through the transfer area 30 under the baffle 29 unto and thence upwardly within the coarse solids section 33 above the small air or plenum compartment 23.

As the process functions or proceeds and as already noted the coarse granules or large solids progressively rise within the subsequent or coarse solids section 33 and ultimately pass as large solids overflow by the weir 27 and the small or lesser sized granules progressively rise within the initial section 32 and pass as small or undersized solids overflow by the weir 25. At the same time the rising gases with fine solid particles or dust entrained therein progressively pass as exist gases to the dust collector wherein the fine solid particles are separated out and collect, and from which the collected dust is recovered as a mass of fine solids.

From that which has preceded, it will be manifest that the apparatus of this Fig. 1 can be employed to separate and recover solids in three classified solids fractions, namely, as a coarse solids fraction, as a small or intermediate solids fraction, and as a fine solids or dust particle size fraction. Also that from damp or even wet fed material resulting lime products, for example, can be recovered or obtained as dry dust, as small or intermediate sized dry solids, and as coarse dry solids or granules.

Figure 2:
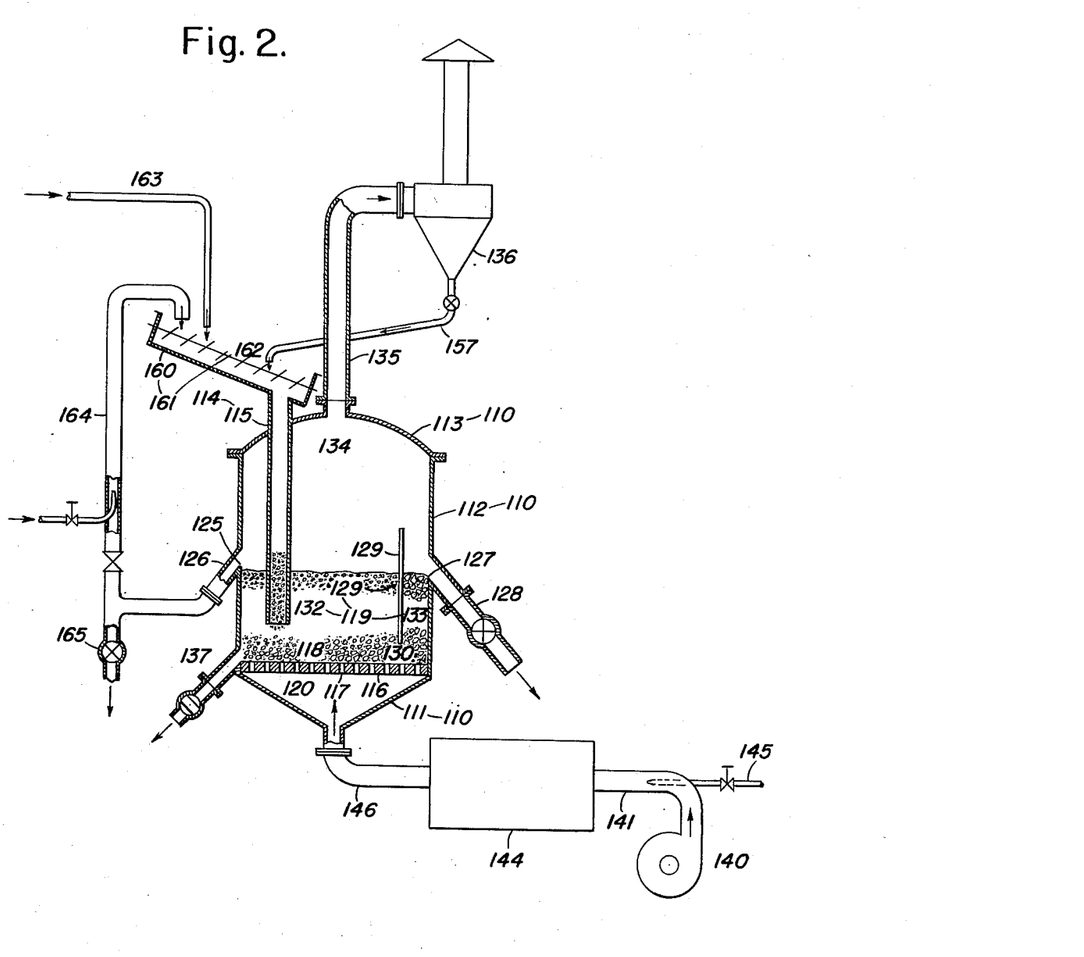
Fig. 2 is a vertical diagrammatic view of another form of apparatus embodying said features or parts connected up and providing a construction adaptable for performing or realizing certain operative steps beyond those realized in and by the apparatus of Fig. 1.

RESPECTING APPARATUS OF FIG. 2

With respect to the form of apparatus of Fig. 2, this is designed whereby to function as a dryer as well as a classifier of or for solids material of different sizes. The tank 110 functions in much the same manner as tank 10 of Fig. 1. However, the classification in the apparatus of Fig. 2 is carried out not in order to produce various final products of different sizes, but in order to separate out and return the fine particles and the dust to a blunger or mixer which so to say works in closed circuit with the drying and classifying apparatus and the entire combination actually constitutes a drier and pelletizing apparatus where the pelletizing takes place in the blunger or mixer and the drying in the FluoSolids bed. According to the form of Fig. 2 tank 110 embodies a bottom section 111, a marginal wall 112, a cap or top member 113, and a flow constriction plate 116 having several relatively small openings or apertures 117 therethrough through which air or other gaseous medium flows under pressure upwardly into the lower portion 118 of a marginally-confined ever-changing body 119 of fluidized solids material supported on and maintained over the apertured plate of flow constriction member 116.

Material to be treated is supplied by means of a feeding mechanism collectively designated as 114 and having a descending feed member or chute 115 for delivering material to be treated to the ever-changing body of solids 119. This ever-changing body of solids or fluidized bed is functionally divided by means of a partial partitioning means or baffle 129 into a relatively large initial feed-receiving and drying section 132 and a subsequent coarse or oversized-granule upward-conveying section 133. In this connection it will be noted that the material supplied by the feeding mechanism broadly designated as 114 is delivered into the fluid solids bed section 132 and that more specifically stated the material entering the fluidized bed section 132 is supplied from a blunger or mixing means 161 and constitutes a pelletized mixture of (1) recirculated small granular material from 164; (2) dust from 157; and (3) slurry or solution from the conveying means or feed pipe 163. The coarse solids pass from the initial drying section, to wit, from the lowermost section of the bed through a solids transfer area 130 which is provided or left below the partial partition 129, to wit, into the lower portion of the subsequent section 133 from the upper portion of which the rising coarse solids ultimately pass as overflow material over weir edge 127 and thence into a descending coarse solids or coarse granule discharge conduit 128.

A dry small solids discharge conduit 126 leads from the tank and provides an overflow weir 125 that determines the general surface level of the solids of the bed particularly of that initial portion or large section 132 of the bed. As to the partial partition referred to, it will be noted that this extends downwardly within the bed to an elevation lower than that of the solids overflow weirs 125 and 127 referred to and that it extends upwardly a substantial distance higher than that of the overflow weirs but terminates short of the upper interior portion of the tank. An air pump or blower 140 has a duct 141 leading to a combustion furnace or heater 144. For the duct 141 referred to there is a valve-controlled fuel supply pipe 145 for delivering fuel into the duct, or as otherwise referred to, into the furnace together with pumped air flowing into the furnace whereby a hot gaseous medium can be supplied from the furnace through a discharge duct 146 leading to and delivering the hot gaseous medium into the plenum chamber 120 which extends for the full distance or area along and below the underside of the flow constriction plate 117. The tank also has an auxiliary discharge chute 137 leading from the region immediately over the constriction plate 117 to a locality outside of the tank. Normally this last-mentioned auxiliary chute is closed against the passage of solids therethrough. From the upper interior portion 134 of the tank there extends a gas discharge flue 135 leading to a dust collector 136 provided whereby to separate out dust particles carried as solids entrained with the outgoing treating and fluidizing gaseous medium so that gas ridded of solid particles can pass from the apparatus while separated out and collected solid particles or fines can be conducted as through a valve-controlled conveyor pipe or other suitable gated conveying means 157 to a receiving hopper or trough 160 of the blunger or mixing means 161 having a movable set of mixing blades or elements 162. By suitable conveying means or spout 163 a liquid solids mixture provided as by a slurry to be dried may be delivered into the trough 160 whereby there can be mixed within the blunger the returned small dust particles or pulverulent material derived from the cyclone separator 136. Also by the conveying means or spout one may supply to the blunger a solution of salt or dissolved solids. By the conveying means, feed pipe or spout 163 one may alternatively feed any chemical-bearing solution or a solution of solid material because when this is mixed with recirculated material from the jet conveying means 164 and dust from the cyclone 136 it will form pellets which will dry in the fluidized solids bed. There is also provided the jet conveying means 164 just referred to by which as operatively desired the smaller dried solids overflowed from the larger feed section 132 can be passed into the blunger for mixing as hot material with the slurry or other material delivered by the feed or line 163 into the blunger. A valve or gate controlled branch section 165 may be provided for passing dried small solids or granules to a region outside of the apparatus. In short the parts 126 and the branch section 165 constitute a small granule solids discharge for conducting away from the apparatus or to a region outside of the apparatus solids passing as overflow over the weir edge 125. The apparatus of this figure together with a description thereof clearly indicates how solids-bearing material or solutions, to wit, introduced as a liquid solids mixture or as slurry, or as a solution of solids into the initial or receiving section of the fluidized bed can be dried and can also be classified into small solids granules on the one hand and coarse solids granules on the other hand whereby the small or lesser size granules can pass as overflowed dry granules by the weir edge 125 while the sorted out coarse or large granules can ultimately pass as overflowed solids from the apparatus to wit as solids which have progressively passed or overflowed the weir 127.

It is thus seen that this combination of blunger and fluidized solids drying and classifying device can start with a solution or a slurry and produce therefrom solid pellets substantially free of dust. This would be quite important in practice, for instance, for the production of such chemical fertilizers as ammonium phosphate and ammonium sulphate.

Figure 3:
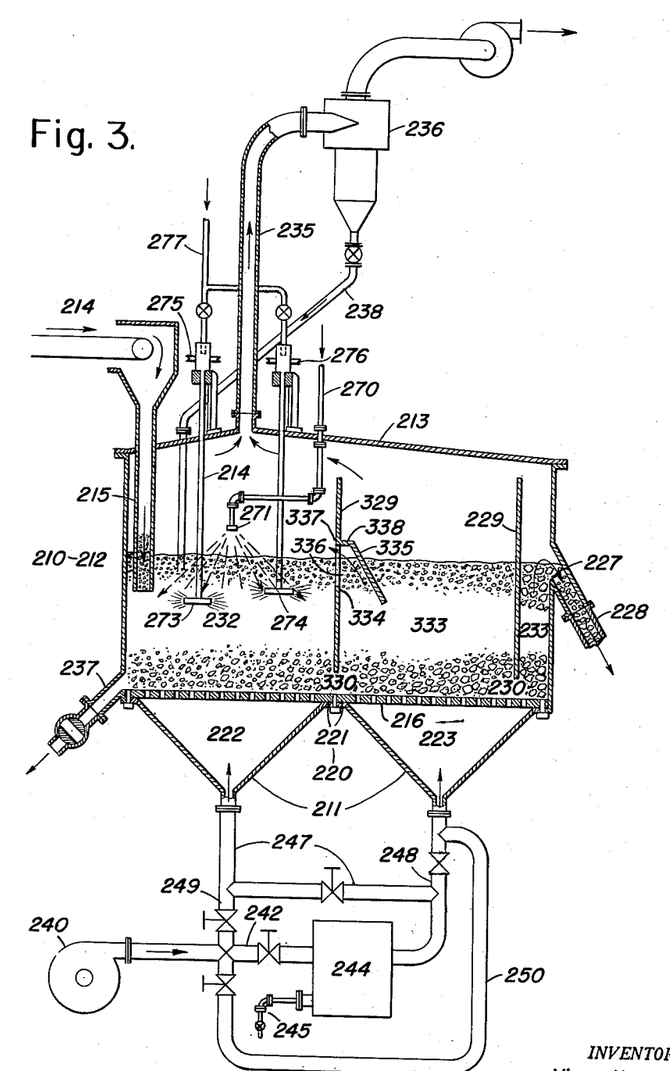
Fig. 3 is a diagrammatic view showing a form of apparatus having certain basic features of construction broadly illustrated by Fig. 1 and in addition other features of construction whereby additional features or operative steps are advantageously employable or realizable therein or thereby.

RESPECTING APPARATUS OF FIG. 3

In this form of apparatus the tank 210 has a marginal wall 212, a bottom or plenum section 211 providing the plenum compartments collectively designated as 220 which may be viewed as having a partitioning wall or dividing means 221 whereby the plenum compartment as a whole may be viewed as having an initial or preceding plenum section 222 and a second or succeeding plenum section 223. The tank has the usual closure top or cap member provided at 213 and also has feed supply means collectively designated as 214 providing a solids-discharge chute 215. In the tank of this form there is a main baffle or partial partition 329 dividing the interior of the tank into an initial feed-receiving and treating section 232 and an intermediate compartment or section 333. This main partial partition or baffle is located substantially in alignment with the partition means 221 of the plenum chamber. The compartments or sections 232 and 333 practically overlie the plenum sections and are respectively designated as 222 and 223. Within this tank there is also a second baffle or partitioning means 229 functionally separating the intermediate section 333 from a final coarse solids section 233. A lowly disposed solids transfer area 330 is provided below the main partial partition or baffle 329 and a lowly disposed transfer area 230 is provided below the final baffle or partial partitioning means 229. The transfer areas 330 and 230 referred to are immediately over the apertured flow constriction plate 216, which is stationarily disposed with respect to the tank 210 or the casing thereof. From the tank and more particularly from the final section 233 there leads a final or coarse solids discharge conduit 228 providing a final or coarse solids overflow weir 227 that determines the general surface level of the solids undergoing treatment within the tank.

Reverting now to the baffles of the partial partitions previously mentioned, it will be noted that as to both the partial partitions 329 and 229, each extends to an elevation below the overflow weir edge 227 of the solids discharge conduit 228 and terminates in spaced relationship above the constriction plate 216, and that each of said baffles rises to an elevation higher than that of said overflow weir 227 but terminates short of the upper interior portion of the tank. At this point it will be noted that the partial partition 329 has extending through an upper portion thereof a solids-transfer hole or passage area 336 whereby there is provided an overflow passageway defined by a high solids overpass edge 334 at elevation lower than but proximate that of the large solids overflow weir edge 227. The upper limit of this solids-transfer hole 336 is defined by a high solids underpass edge portion 337 at elevation substantially higher than that of said large solids overflow weir 227. It is also pointed out that there is a deflecting plate 335 located rearwardly with respect to said partition 329. The general slope of this deflecting plate is upwardly and forwardly and it has a horizontal top portion 338 that continues to the partition 329 and to a region thereof above the upper structural portions defining limits of said solids transfer hole. Thusly there is provided a shield type of guiding means or deflecting plate for directing upflow gases rising within subsequent compartment 332 into the area below the deflecting plate 335 and for directing solids forced upwardly and thence backwardly by the flowing gases into the preceding compartment 232 whereby there can be carried out in said preceding compartment a repetitive treatment or further operative step on the material transferred as described. Because of the construction of the directive type of guiding means or deflecting plate referred to and its operative position with respect to the partial partition or baffle 329, it functions to aid in the transferring of gas-lifted solids over and beyond an overpass edge at elevation relatively high as compared with the elevation of the solids overflow weir 227. The feed chute 215 delivers the solids material to be treated into the initial section 232. This feed chute delivers the solid material to be treated into the initial section 232 at elevation lower than that of the general surface level within the tank—to wit, at an elevation lower than that of the overflow weir edge 227; in other words, the material supplied into the tank for treatment therein is thusly "submergedly" delivered, so to speak, into that portion of the bed wherein the initial treatment is being carried out. That section 232 of Fig. 3, which is ahead of the partition 328, may be properly referred to as the initial feed-receiving section which directly overlies that portion of the flow constriction plate which in turn is directly underlain by an initial or preceding plenum section 222, while the sections 333 and 233, which are subsequent to the partial partition 329, may collectively be referred to as a subsequent section overlying that portion of the flow constriction plate which is directly underlain by a subsequent or succeeding plenum section 223. The portion of the apparatus of Fig. 3 just referred to and which comprehends section 333 and section 233 may also be viewed as having a coarse solids discharge conduit 228 and of which the coarse solids overflow weir for that section is provided by the solids overflow weir 227. An auxiliary solids-discharge conduit 237 which is normally closed is provided for passing solids material from the region immediately over the flow constriction plate to a locality outside of the tank should transfer be deemed advisable at any particular time. An outflow conduit for gases leaving the tank is provided at 235 and leads into a dust collecting and separating means 236 from which the gases relieved of dust particles pass along one path while collected dust particles can be passed as and when desired through a gate or valve-controlled conduit 238 or other suitable conveying means back into the tank. The apparatus of this figure is also shown as provided with a water or other solution supply pipe 270 having a spray head 271 located over or within the fluidized body section 232—the initial treating section of the ever-changing body. The spray head 271, or spraying means, of which head constitutes a part, may also be used for spraying slurry, i. e. suspensions of solids in water or solution. Moreover, if desired, the spray head or spraying means embodying several heads may be installed so that the head or heads thereof may be below the surface of the fluidized bed. In this connection it will be pointed out that the spray head or heads employed may be in the form of rotary type, see heads 273 and 274, and may be provided by heads located above the bed, below the surface of the bed, or by heads of which there is one or more located above the bed while one or more is located within and below the surface level of the bed. A "submerged" delivery of solutions or slurries from a rotary spray means disposed within the fluidized bed of ever-changing solids will be favorable to a complete or substantial and suitable dispersion of solution or slurries in the bed and will aid in insuring that the fluidized pellet will be uniformly coated with the solution or slurry. In connection with the foregoing it will be noted that where the spray heads as 273 and 274 are to be mechanically rotated, this can be accomplished by mechanical driving means which include driven members as pulleys or sheave wheels 275 and 276. The liquid or material to be sprayed is delivered—preferably under pressure—but not necessarily so through the valve-controlled branching supply pipe 277. In this figure there is shown an air pump or blower 240 having a valve-controlled duct 242 leading to a combustion chamber or furnace 244 that is supplied with fuel for heating the same through the fuel supply means 245. From this furnace a discharge duct for hot gaseous medium has two valve-controlled branches 247 and 248 respectively leading to the plenum sections 222 and 223. From that portion of the duct 242 which is between the pump 240 and the valve therein there extend two valve-controlled branches 249 and 250 respectively leading to the plenum sections 222 and 223. By this arrangement it will be seen that either hot air or hot gases can be optionally delivered to the plenum sections 232 and 233, and that also the gaseous medium delivered to said plenum sections or to any one of them can be tempered by controllably mixing the cold air and the hot gaseous medium passing thereto by adjusting the valves of said branching pipes.

GENERAL

In each form of the apparatus the air, or gaseous medium as the case may be, is supplied to the plenum compartments or plenum sections in a manner to maintain the solids of the bed supported on and over the constriction plate in a fluidized condition. Each form of apparatus is constructed whereby any of the solids reaching the overflow weirs can pass therefrom as overflow material through and thence outwardly to a region outside the apparatus without impairing the functioning of the apparatus. Each of these discharge conduits which have been mentioned as having the overflow weirs is preferably provided with a valve-mechanism or other means whereby to discourage the entrance of outside air and a backflow of outside air upwardly into the tank.

The form of apparatus of Fig. 1 may be used as a simple classifier for separating solids into two or three solids fractions, but the classifier or air sizer can be easily modified to deliver more products and can be adopted to series classification for closer sizing. The principle of this invention of this form may be used for a combined drying and classifying operation.

As to the apparatus of Fig. 2, which embodies the blunger, this finds employment in a place where one desires to get classification of solids bearing materials according to operations which may embody the treating of slurry mixtures or materials supplied in relatively damp form, for instance, for the production of granulated products such as chemical fertilizers, lime, or other chemical products. The apparatus of Fig. 2 can be employed for producing pellets or solids in granular form.

As to the apparatus of Fig. 3, this has general application. It has application where one desires to treat fine pulverulent material by the addition of a liquid solution of a solid chemical and to gradually build up or increase the particle size thereof into forms of relatively uniformly sized pellets by drying; that is, to a size or sizes which can be delivered as granular material of size or sizes relatively large as compared with the starting material, and which pellets or granules can pass as overflow over a solids overflow weir edge such as weir edge 227.

Further in connection with the apparatus of Fig. 3 it will be noted, as previously pointed out, that the partial partition 329, which has the principal solids transfer area provided by the opening 336 with the high solids overpass edge 334, provides a construction of a type which readily facilitates the transfer of solids from any one compartment section at one side of the partial partition over the high solids overpass edge 334 into an adjacent compartment on the other side of the partial partition—to wit: in a manner as directed and facilitated by the slanting deflecting plate having an upward and inward slope with respect to the partial partition to an elevation above and in fact higher than that of the solids overpass edge 334 or that of the solids overflow weir edge 227. Thusly there can be passed solids from one compartment to the next adjacent compartment, but the direction of such transfer from one compartment to the next adjacent compartment would be according to the location of the slanting deflecting plate with respect to the particular partition with which it is associated. Such slant may be either in what may be called a general upward and rearward direction over and with respect to the particular partition or in a general upward and forward direction with respect to the same. It is also to be noted that the lower edge of the upwardly and inwardly extending directing or sloping deflecting plate 335 is disposed at quite a low elevation within the bed of fluidized solids—to wit: at elevation lower than that of the solids overflow weir edge 227. However the low edge of the directing or deflecting plate 335 is at elevation higher than that of the lowermost edge of the partial partition or baffle 329 below which there is provided the lowly disposed solids transfer passage area 330.

With respect to the general subject matter it will be noted that the deflector plate 335, together with the vertical baffle or partial partition 334 with which it is associated, form a hood, so to speak, which is wider towards the bottom. This arrangement constitutes a simple way of recirculating solids from a fluidized bed as 333 on one side of the baffle to an adjacent fluidized bed as 232 on the other side of the baffle, or vice versa. As before indicated, it is operable or functionable in the following manner: If one assumes that the upflow of gas is uniform across the constriction plate 216, the amount of gas entering below the deflector plate will be in proportion to the area between the low edge of the deflector plate 335 and the low portion of the vertical baffle or partial partition 329. The area between the deflector plate 335 and the vertical baffle or partition 329 progressively decreases as the gas passes upwardly therein. The space velocity of the ascending gas will increase in inverse proportion and this in turn causes the fluid density of the material under the deflector plate 335 to be lowered, thus forming a certain column of material that will be raised and flow through the opening provided at 336 to the other side of the vertical baffle or partial partition. The level of the fluidized bed, for example, in the preceding section or compartment 232 will, however, remain substantially constant because it will be equalized with the fluidized bed on the other side of the baffle or partial partition 329 through the bottom opening 330. In this way a continuous recirculation of material from the fluidized bed 333, for example, back to the fluidized bed 233 can be accomplished. Such a circulation or recirculation of part of the fluidized material from one compartment to an adjacent compartment can be accomplished by suitably embodying a slanting deflector plate properly positioned and installed with respect to a particular upwardly-extending partial partition located between adjacent fluidized solids bed portions or compartment sections—namely, by providing a properly sloping deflecting plate at a distance from a partial partition functionally separating the adjacent compartment sections and by introducing additional fluidizing gas for creating a column of less dense material which will rise under the deflecting plate and through an opening or flow passage area over a solids overflow edge of the partial partition. This additional fluidizing air or gas, as the case may be, can be added in several ways and in controlled quantities for accomplishing the desired end.

The purpose of the deflector plate 335 and opening 300 is to recirculate a part of the smaller medium sized pellets from the upper part of the fluid bed 333 and back to the coating compartment 232 where the pellets would be coated with a further layer of material or would build up further. With the arrangement of the deflector as shown, this return circulation will take place because a certain amount of gas ascending from the constriction plate will be trapped under the deflector plate and the gas velocity will increase towards the top causing a flow of the material through the opening 330 from compartment 333 to compartment 232.

Apparatus such as illustrated by Fig. 3 may be used for producing mixed fertilizers for example from or embodying a superphosphate with which a chemical solution as ammonium nitrate or other ammonium solution is supplied for producing the mixed fertilizers.

For certain types of treatment apparatus where an extremely low pressure head for the air or gas prevails above the fluidized bed, it may be feasible to dispense with air locks or equivalent means in or for the solids discharge conduits but otherwise, in general, the air discharge conduits have means in or associated therewith to prevent undue breakage of outside air upwardly therethrough into the tank.

In general, the requisite pressure for the air or gaseous medium is within pressures obtainable by a centrifugal air blower.

What is claimed is:

1. An apparatus of the class described comprising an enclosing casing having a substantially horizontally-extending partition with apertures therethrough for thereby providing a gas-flow constriction member for supporting an ever-changing body of solids thereupon and dividing the interior of the casing into an underlying gas-receiving compartment and a compartment wherein there is maintained said ever-changing bed of solids that in turn is overlain by a freeboard space for receiving gases passing from the bed upwardly thereinto; a transversely- and a vertically-extending partial partitioning means within said casing extending downwardly into said bed and having a lower portion thereof terminating above but in vertical spaced relationship with respect to said constriction member and dividing the bed-containing region into a main operating compartment and a subsequent compartment into which there laterally pass solids from a low region of the operating compartment through the low open area left between the lower end of said partial partitioning means and top portion of said constriction member; means for supplying and delivering gaseous medium under pressure into said gas-receiving compartment; dust-separating means installed with respect to said casing for receiving dust-laden gaseous medium passing thereinto from the freeboard space above said ever-changing bed; means for passing separated-out dust from said dust-separating means as fine solids passing therefrom; a discharge pipe constituting a solids-discharge conduit leading from said operating compartment and provided for the passing of solids from said operating compartment to a region outside of the apparatus; a second discharge pipe constituting a solids-discharge conduit leading from said subsequent compartment and provided for the passing of solids from said subsequent compartment to a region outside of the apparatus, the upper end of which said second pipe is provided with a solids overflow weir at elevation above that of the lower end of said partition but lower than that of the upper edge of said partition; and means for delivering solids material into the operating compartment as feed for the ever-changing bed therein; the gas supplied into the gas-receiving compartment below the partition being of sufficient pressure and quantity for maintaining the ever-changing bed in a fluidized condition according to which the solids of the bed cause the surface level thereof to take on an appearance simulating boiling liquid.

2. An apparatus according to claim 1, in which the gas-receiving compartment below the flow-constriction member is divided to provide a gas-receiving section under and for the main operating compartment and another gas-receiving section under and for the subsequent compartment, and in which the means for supplying gas to said gas-receiving compartment as a whole has one branch leading into one section thereof and another branch leading to the other section thereof and which means for supplying gas has valve means for regulating the relative flow of gas therefrom into said gas-receiving sections.

3. An apparatus according to claim 1, in which the gas-receiving compartment below the flow-constriction member and the gas-supply means leading to said gas-receiving compartment below the plate include a valve-controlled pressure-gas supply section leading to the region immediately below the operating compartment and a valve-controlled pressure gas-supply section leading to the region immediately below the subsequent compartment.

4. Apparatus according to claim 1, in which there is a second vertically-extending partial partition functionally dividing the operating compartment into a pre-treating or pre-conditioning section and a main operating section, which last-mentioned partition extends from and at elevation higher than that of the solids overflow weirs and extends downwardly into the ever-changing solids bed to elevation lower than that of at least one of said weirs; in which there is means for supplying as feed material solids delivered thereby into the pre-treating section of the operating compartment; in which solids pass from the pre-treating section below said second partial partition into the main operating section; and in which there is a solids-discharge means leading from the lower portion of the operating compartment to a region outside of the apparatus.

5. An apparatus according to claim 1, in which there is a blunger from which material mixed therein is passed onto the means for delivering solids material as feed into the operating compartment; in which there is provided means for passing into the blunger dust solids derived from the dust-separating means; in which there is provided means for passing into the blunger solids overflowing into a solids-discharge pipe that leads from the operating compartment; and in which there is conveying means for delivering into the blunger other material to be mixed within and by the blunger.

6. An apparatus of the class described comprising an enclosing casing having a substantially horizontally-extending partition with apertures therethrough for providing a gas-permeable constriction member for supporting an ever-changing bed of solids thereupon and dividing the interior of the casing into an underlying gas-receiving compartment and an overlying compartment wherein there is maintained said ever-changing bed of solids that in turn is directly overlain by a freeboard space for receiving gas passing from the bed upwardly therethrough; means for releasing gaseous medium from within said overlying freeboard space; a vertically-extending partial partitioning means within said casing extending downwardly into said bed and having a lower portion thereof terminating above but in vertically-spaced relationship with respect to said constriction member and dividing the bed containing region into a main operating compartment and a functionally separate subsequent compartment into which there laterally pass solids from the lower region of the operating compartment through the open area left between the lower end of the partial partitioning means and the upper portion of the constriction plate; a second partitioning means extending downwardly into and within that portion of the ever-changing bed which is within the main operating compartment but terminating above and in spaced relationship above the flow-constriction member, which said second partitioning member divides the operating compartment into different functioning but communicating sections of which one is a pre-treating section while the other is a main section of the operating compartment; means for supplying solids as feed material and delivering the same into the pre-treating section of the operating compartment; a solids-discharge conduit leading from a region within the subsequent compartment, said conduit being provided with a solids-overflow weir at elevation higher than that of the lower edge portions defining underflow passageways leading below the aforementioned partial partitioning means but lower than that of the upper portions of said partial partitioning means, which overflow weir determines the normal operative surface level of the solids in said compartments; and means for supplying gas under pressure upwardly from the constriction member into the lower portion of the ever-changing bed of solids material supported by said plate, which gas thus delivered is at sufficient pressure for causing the solids of said bed to take on a condition identified as fluidized solids and in which certain heavier or larger solids stratify in the lower portion of the bed.

7. An apparatus according to claim 6, in which there is also included a cyclone separator providing a dust-separating means having an intake means leading thereinto by which dust-laden gases from the freeboard space above the ever-changing bed pass into the cyclone separator, and means for passing separated-out dust from said separator and for delivering the same into the pre-treating section of the operating compartment.

8. Apparatus according to claim 6, in which the gas-receiving compartment under the apertured plate includes a section through which pressure air is supplied to the pre-treating section of the operating compartment and in which through another gas-receiving section gas is supplied to the remaining portion of the ever-changing bed within the casing; said air-supply means having a valve-controlled conduit through which the supplied air is delivered into the pre-treating section and the means by which gas is supplied having a valve-controlled conduit leading to the main section of the operating compartment.

9. An apparatus according to claim 6, having a gaseous medium supply means from which cool gas is delivered under superatmospheric pressure from a valve-controlled branch leading thereto and which gas supply means also has another branch leading to a section of operating compartment into which the hot gas may be supplied, said last-mentioned branch being provided for heating gas flowing therethrough.

10. Apparatus of the class described comprising an enclosing casing having a substantially horizontally - extending partition with apertures therethrough for providing a gas-permeable constriction member for supporting an ever-changing body of solids thereon and dividing the interior of the casing into an underlying gas-receiving means and an overlying compartment wherein there is maintained a marginally-confined ever-changing bed of solids that in turn is overlain by a freeboard space for receiving gas passing from the bed upwardly thereinto; a main vertically-extending partitioning means within said casing extending downwardly into said bed and having a lower portion thereof terminating above but in vertically-spaced relationship with respect to said constriction member and dividing the bed-containing region into a main operating compartment and a subsequent compartment; a second or auxiliary partial partitioning means within the casing extending downwardly into the portion of the bed within the operating compartment and having a lower portion thereof terminating above but in vertically-spaced relationship with said constriction member and dividing the operating compartment into an initial section and a main operating section; said underlying gas-receiving means embodying the initial gas-receiving section immediately below the initial section of the operating compartment and a main gas-receiving section immediately below the main operating section of the operating compartment and also extending to the region below the subsequent compartment; means having a branch pipe line for supplying gaseous medium under pressure into said initial gas-receiving section and also having a branch pipe line for supplying gaseous medium under pressure into said main gas-receiving section; means for supplying pulverized material as feed delivered into said initial compartment; dust-separating means installed with respect to said casing for receiving dust-laden gases passing thereinto from the freeboard space above said ever-changing bed; means for passing separated-out dust from said dust-separating means into said initial section of the operating compartment; means for supplying liquid and for spraying the same upon the material within the initial section of the operating compartment and a solids-discharge pipe providing a solids-discharge conduit leading from the subsequent compartment, which pipe has an upper edge portion providing a solids-overflow weir at elevation higher than that of the lower edge portions of the partitions but lower than that of the upper edge portions of said partitions.

11. Apparatus according to claim 10, in which there is a valve-controlled pipe for delivering a gaseous medium such as air into the region immediately below the initial section of the operating compartment and in which there is a valve-controlled pipe with heating means associated therewith for delivering a hot gaseous medium into the region immediately underlying the main section of the operating compartment.

12. A classifying apparatus comprising in combination a tank having a marginal confining wall; a top closure section; a bottom gas-receiving section constituting a plenum means, an apertured gas-flow constriction plate providing a roof for the plenum means and a floor for an ever-changing body of solids maintainable as a marginally confined fluidized bed on and supported over said constriction plate and otherwise separating said bed from the plenum section except through the apertured portions of the constriction plate; a tubular coarse-solids discharge means having an upper intake end providing a coarse-solids overflow weir at elevation higher than that of the constriction plate but lower than that of the upper interior portion of the top closure and a tubular fine-solids discharge means having an upper intake end providing a fine-solids overpass edge at elevation higher than that of the constriction plate but lower than that of the top closure, each of said solids-discharge means being constructed whereby when open each provides for the outward passing of solids flowing thereinto to a region outside of the tank; means for supplying a gaseous medium under pressure into the plenum section below said constriction plate; feeding means for delivering fluidized solids from the outside of the tank to said fluidized bed; a vertically-extending baffle providing a partial partitioning means between the discharge section of the feeding means on the one hand and coarse-solids overflow weir edge on the other hand, which partial partitioning means is constructed so that a lower edge portion thereof is at elevation vertically spaced above said constriction plate but lower than that of the solids overflow weir edges and extending upwardly to an elevation higher than that of said main solids overflow weir edges; gas releasing means providing a discharge passageway for gases with dust particles therein leading from within the upper interior portion of the tank; and in which the plenum means is divided by a partition into two separate gas-supplied sections, which said last-mentioned plenum partition is located below and in substantial alignment with the aforementioned partial partition within the region above the constriction plate.

13. Apparatus according to claim 12, in which the gas-releasing means includes a cyclone separator into the upper portion of which the dust-laden gases are initially received and from the lower portion of which the separated-out gas particles are passed, and in which apparatus there is a valve-controlled branch leading to and delivering separated-out dust particles into the feeding means.

14. Apparatus according to claim 1, in which the feeding means includes a plunger for receiving slurry, in which there is means for conducting quantities of solids from the solids-discharge means and for delivering the thus conducted quantities into the blunger, and in which the dust-laden gases from the upper interior portion of the tank are conveyed into a dust collector from which quantities of separated-out dust particles are conducted to and delivered into the blunger while gases thus ridded of quantities of the dust particles previously entrained therein pass from the collector.

15. Apparatus according to claim 1 having a blunger constituting part of the feeder means; a cyclone separator constituting part of the gas-discharge means; means for passing dust particles from the cyclone separator into the blunger; means for feeding slurry to be dried into the blunger; and means for heating gaseous medium supplied to the plenum means from which gaseous medium can pass upwardly through apertures of the constriction plates into the ever-changing body of solids undergoing treatment within the apparatus.

16. An apparatus according to claim 1, in which the gas-receiving compartment below the horizontally-extending partition with apertures therein is divided into two gas-receiving sections; in which the means for supplying and delivering gaseous medium under pressure includes a furnace, an initial cold air supply conduit leading to the furnace; and in which there is piping embodied in the means for supplying and delivering the gaseous medium optionally to either or both of the plenum sections without going through the furnace or optionally through either or both of the plenum sections as heated gaseous medium passing from the furnace.

17. An apparatus according to claim 12, in which each of the plenum sections is supplied with gaseous medium of which the quantity of gas supplied to at least one of said plenum sections can be regulated relative to the quantity of gas supplied to the other of said plenum sections, and of which one plenum section directly underlies the initial feed-receiving section above the constriction means while the other directly underlies the subsequent further treating section above the constriction means.

18. Apparatus according to claim 1, in which there is included a furnace, a hot gas conduit leading from the furnace and having branching sections for delivering hot gaseous medium into said separate plenum sections and valve means for regulating the relative flow of hot gaseous medium into said separate plenum sections.

19. Apparatus according to claim 1, in which the gas-receiving compartment is divided into two separate plenum sections; in which the means for supplying gaseous medium includes a furnace having an air conduit leading thereto, a hot gaseous medium conduit leading from the furnace and having valve control branches leading therefrom, each of which said branches leads into a plenum section corresponding thereto and valve controlled branch lines leading from the air conduit, one of each of said last-mentioned air branch lines also leading into a plenum section corresponding thereto.

20. Apparatus according to claim 1, in which there is provided means for delivering liquid to the solids undergoing treatment within the initial feed-receiving section of the tank.

21. A classifying apparatus comprising in combination a gas-tight tank having a marginal confining wall, a closure top, and a bottom construction constituting a compartmented plenum means for receiving a gaseous medium supplied thereinto, and an apertured flow constriction plate providing a roof for the plenum means and serving as a floor for the ever-changing body of fluidized solids within the confining walls of a treating compartment; means for continuously delivering a gaseous medium under pressure into the plenum compartment; means for releasing from the upper interior portion of the tank gases which would otherwise unduly accumulate therein; a set of horizontally spaced partial partitions of which a first partial partition terminates short of the upper interior of the tank and also short of the flow constriction plate, while the second of said partial partitions terminates short of the flow constriction plate and which partitions as a set divide the treatment compartment into an initial feed receiving section, an intermediate main section and a final upwardly-extending solids receiving section, which initial and intermediate sections are in constant solids communication through a low solids passage area below the first partition while the intermediate and final sections are in constant solids communication through a low solids passage area below the second partition; means for supplying finely-divided solids as feed material into the initial section; and solids discharge means leading from said final section to a region outside of the tank, said solids discharge means being equipped with a solids overflow weir at elevation higher than that of the low end of said second partial partition and determining the overflow elevation past which solids from the top of the final section must pass before leaving the bed; said means for supplying and delivering finely-divided solids into the tank, said gas-releasing means and said solids discharge means being constructed for discouraging backflow of air therefrom and into the tank.

22. Apparatus according to claim 10, in which the second partial partition is provided with an opening in the upper portion thereof extending to elevation higher from elevation lower than that of the solids-overflow weir; and in which at the rear of said second partial partition there is provided an upwardly and forwardly inclined deflector plate extending to an upper edge portion of said second partial partition.

23. An apparatus comprising an enclosed casing within which is a gas-permeable horizontal partition dividing the casing into an upper solids-treating zone and a lower gas-receiving zone, means for delivering gas to the gas-receiving zone at a velocity sufficient to fluidize finely-divided solids in the solids-treating zone; means for removing gas from above the solids-treating zone and constructed for minimizing the backflow of air into the casing; means for supplying finely-divided solids into the solids treating zone; a first vertically-extending partition whose lower edge terminates above the gas-permeable horizontal partition and whose upper edge terminates below the gas discharge means; said first partition dividing the solids-treating zone into a pre-treating compartment and a main compartment that are in free solids transfer communication through the open passage area below said first partition; a second vertically-extending partition descending within the main compartment but terminating short of the gas-permeable partition and dividing the main compartment into an intermediate section and a final section which are in solids transfer communication through the open passage area below the second partition; and means for outflowing treated solids from the final section from an elevation higher than that of the lower end of the second vertically-extending partition and constructed for delivering the outflowing solids to a region outside of the casing while minimizing the backflow of air into the casing.

24. An apparatus according to claim 23, with the addition of at least one spraying means extending into the casing above the horizontal gas-permeable partition.

25. An apparatus according to claim 24, wherein the spraying means has a spray head terminating at elevation lower than that of the treated solids outflow weir.

26. An apparatus of the class described comprising an enclosing casing having a substantially horizontally-extending partition with apertures therethrough for thereby providing a gas-flow constriction member for supporting an ever-changing body of solids thereupon and dividing the interior of the casing into an underlying gas-receiving compartment and a compartment wherein there is maintained said ever-changing bed of solids that in turn is overlain by a freeboard space for receiving gases passing from the bed upwardly thereinto; a transversely- and a vertically-extending partial partitioning means within said casing extending downwardly into said bed and having a lower portion thereof terminating above but in vertical spaced relationship with respect to said constriction member and dividing the bed-containing region into a main operating compartment and a functionally separated subsequent compartment into which there laterally pass solids from a low region of the operating compartment through the low open area left between the lower end of said partial partitioning means and top portion of said constriction member; means for supplying and delivering gaseous media under pressure into said gas-receiving compartment; dust-separating means installed with respect to said casing for receiving dust-laden gaseous medium passing thereinto from the freeboard space above said ever-changing bed; means for passing separated-out dust from said dust-separating means as fine solids passing therefrom and for delivering a quantity thereof into the operating compartment; a discharge pipe constituting a solids-discharge conduit leading from said operating compartment and provided for the passing of solids from said operating compartment to a region outside of the apparatus; a second discharge pipe constituting a solids-discharge conduit leading from said subsequent compartment and provided for the passing of solids from said subsequent compartment to a region outside of the apparatus, the upper end of which said second pipe is provided with a solids overflow weir at elevation above that of the lower end of said partition but lower than that of the upper edge of said partition; and means for delivering solids material into the operating compartment as feed for the ever-changing bed therein; the gas supplied into the gas-receiving compartment below the partition being of sufficient pressure and quantity for maintaining the ever-changing bed in a fluidized condition according to which the solids of the bed cause the surface level thereof to take on an appearance simulating boiling liquid.

27. Apparatus according to claim 21 in which the plenum compartment is divided into a plenum section underlying the initial feed-receiving section, and a plenum section underlying the intermediate compartment section.

28. Apparatus according to claim 21 in which the plenum compartment is divided and has a first plenum section extending under the initial feed-receiving section and also has a second plenum section extending under the final section of the treating compartment.

29. Apparatus according to claim 21 in which plenum compartment has a plurality of plenum sections operatively disposed under different sections of the feed receiving and treating compartment and in which there is means for pumping gaseous media in pressure-controlled quantities to each of the respective plenum sections.

30. Apparatus according to claim 21 in which the means for removing gas from the upper interior portions of the tank embodies gas and dust separating means from which air ridded of much of the dust then can be passed from the apparatus while separated-out dust is passed into the initial section for repetitive treatment.

31. Apparatus according to claim 21 in which there is a fluid supply pipe leading into the tank, tipped with a spray head disposed within the tank by which a fluid such as water can be injected against solids of the bed undergoing treatment there.

32. An apparatus comprising an enclosing casing within which there is a gas-permeable horizontal partition dividing the casing into an upper solids-treating zone and a lower gas-receiving zone; means for delivering gas into the gas-receiving zone at a velocity and pressure sufficient to fluidize finely-divided solids in said solids-treating zone; means for removing gas from above the solids-treating zone and for minimizing the backflow of air into the casing; a vertically-extending partition whose lower edge terminates above the gas-permeable horizontal partition and whose upper edge terminates spacedly below the upper interior portion of the enclosing casing, said partial partitioning means dividing the solids-treating zone into a preceding solids-receiving compartment and a subsequent compartment that are in free solids transfer communication through the passage area below said partition; means for supplying to and delivering finely-divided solids material for operative treatment into said preceding compartment; means for outflowing treated solids from said subsequent compartment and ultimately past a solids overflow weir at elevation higher than that of the lower end portion of said vertically-extending partition, said vertically-extending partial partition having an upper solids overpass edge portion at elevation proximate to that of the overflow elevation of the solids overflow weir, and means for passing treated solids from the casing while minimizing the backflow of air into the casing; said apparatus also having means dividing the gas-receiving zone into a preceding plenum section directly underlying and corresponding to the preceding solids-receiving compartment and a succeeding plenum section directly underlying the subsequent compartment; and valve-controlled means for supplying a gaseous medium under selected pressure and volume into any one of said plenum sections relative to the other.

33. Apparatus according to claim 32 in which there is a deflector baffle fixedly positioned with respect to the upper portion of the vertically-extending partial partition and sloping upwardly from within one compartment towards and above the upper solids overpass edge portion of the partial partition.

34. Apparatus according to claim 32 in which the vertically-extending partial partition has a solids transfer opening through the upper portion thereof and so located in and with respect to the partition that there is a solids overpass edge at elevation approaching but not reaching the elevation of the solids overflow weir and in which the upper portion of said opening is determined by an uppermost solids underpass edge which is higher than that of the solids overflow weir, and in which there is an upwardly and rearwardly extending deflector baffle functionally positioned with respect to the vertically-extending partition.

35. Apparatus according to claim 32 in which there is a deflector baffle attached to the vertically-extending partial partition and provided for directing gas-lifted solids towards and past said upper solids overpass edge portion of the partial partition.

36. Apparatus comprising an enclosing casing within which there is a gas permeable horizontal partition dividing the casing into an upper solids-fluidizing zone and a lower gas-receiving zone; means for delivering gas into the gas-receiving zone at a velocity and pressure sufficient to fluidize finely-divided solids in said solids-fluidizing zone; means for removing gas from the solids-fluidizing zone and for minimizing the backflow of gas into the casing; a vertically-extending partition having a lower solids underpass edge spaced above the gas-permeable horizontal partition and an upper solids overpass edge at elevation higher than that of said solids underpass edge and lower than that of the upper interior portion of the enclosing casing, said partitioning means dividing the solids-fluidizing zone into a preceding solids-fluidizing compartment and a succeeding solids-fluidizing compartment that are in free solids transfer communication through the passage area below said lower solids underpass edge; means for supplying finely-divided solids to said preceding compartment; means for discharging finely-divided solids from said succeeding compartment; means for moving finely-divided solids from one of said compartments to the other of said compartments, comprising a deflector baffle extending from an elevation below that of the upper solids overpass edge of the partition to an elevation at least as high as said upper solids overpass edge, said deflector baffle being spacedly positioned with respect to the partial partition and having a lower portion sloping upwardly from within the mass of fluidized solids within one compartment towards said partial partition whereby finely-divided solids from one compartment are gas-liftable for transfer over the upper solids overpass edge of said partition.

37. Apparatus according to claim 36 with the addition of dividing means dividing the gas-receiving zone into a preceding plenum section directly underlying and corresponding to the preceding solids-fluidizing compartment and a succeeding plenum section directly underlying and corresponding to the succeeding solids-fluidizing compartment; and valve controlled means for supplying a gaseous medium under selected pressure and volume into any one of said plenum sections relative to the other.

VIGGO HARMS.

REFERENCES CITED

The following references are of record in the file of this patent:

UNITED STATES PATENTS

| Number | Name | Date |
|---|---|---|
| 1,291,137 | Reed | Jan. 14, 1919 |
| 1,561,971 | Coffin | Nov. 17, 1925 |
| 1,984,380 | Odell | Dec. 18, 1934 |
| 2,116,613 | Bedford | May 10, 1938 |
| 2,310,894 | Brusset | Feb. 9, 1943 |
| 2,464,812 | Johnson | Mar. 22, 1949 |
| 2,475,984 | Owen | July 12, 1949 |
| 2,477,751 | Johnson | Aug. 2, 1949 |

FOREIGN PATENTS

| Number | Country | Date |
|---|---|---|
| 299,936 | Great Britain | Nov. 8, 1928 |
| 423,959 | Great Britain | Feb. 12, 1935 |